United States Patent [19]

Morrow

[11] Patent Number: 5,094,295

[45] Date of Patent: Mar. 10, 1992

[54] ENHANCED OIL RECOVERY USING ALKYLATED, SULFONATED, OXIDIZED LIGNIN SURFACTANTS

[75] Inventor: Lawrence R. Morrow, Richmond, Tex.

[73] Assignee: Texaco Inc., White Plains, N.Y.

[21] Appl. No.: 631,843

[22] Filed: Dec. 21, 1990

[51] Int. Cl.$^5$ .............................................. E21B 43/22
[52] U.S. Cl. ............................... 166/274; 166/275; 252/8.554
[58] Field of Search ..................... 166/273, 274, 275; 252/8.554

[56] References Cited

U.S. PATENT DOCUMENTS

| | | | |
|---|---|---|---|
| 4,307,782 | 12/1981 | Schievelbein | 166/274 |
| 4,438,002 | 3/1984 | Schievelbein | 166/275 X |
| 4,611,659 | 9/1986 | DeBons et al. | 166/274 |
| 4,781,251 | 11/1988 | Naae et al. | 166/273 X |
| 4,787,454 | 11/1988 | Naae et al. | 252/8.554 X |
| 4,790,382 | 12/1988 | Morrow et al. | 166/274 |
| 4,822,501 | 4/1989 | DeBons et al. | 166/275 X |

*Primary Examiner*—George A. Suchfield
*Attorney, Agent, or Firm*—Jack H. Park; Kenneth R. Priem; Harold J. Delhommer

[57] ABSTRACT

The invention is a method of producing water soluble surfactants from lignin, which comprises alkylating lignin at phenolic oxygen sites with an alkyl chain having about 3 to about 24 carbon atoms, sulfonating the alkylated lignin, and oxidizing the alkylated, sulfonated lignin sufficiently to break the lignin into smaller polymeric and monomeric compounds having water soluble surfactant properties. The invention also includes using these alkylated, sulfonated, oxidized lignin surfactants in surfactant floods for enhanced oil recovery.

10 Claims, No Drawings

ENHANCED OIL RECOVERY USING ALKYLATED, SULFONATED, OXIDIZED LIGNIN SURFACTANTS

BACKGROUND OF THE INVENTION

This invention relates to a method of producing surfactants from lignin. More particularly, the invention discloses a process of alkylating, sulfonating and then oxidizing lignin to form a group of compounds having water soluble surfactant properties. These compounds may be used in surfactant flooding to recover hydrocarbons from underground formations.

Surface active compounds or surfactants have become extremely important chemicals in our society. Numberless types of surfactants are used for a myriad of applications. To work effectively, most surfactants require water soluble and oil soluble characteristics. It is these mixed characteristics which enable surfactants to lower the surface tension between two disparate liquids.

One problem with many surfactants is their high cost of manufacture. Surfactants which are relatively cheap have an inherent advantage in the marketplace.

A minor use of surfactants has been in surfactant flooding systems for enhanced oil recovery. But because of the relatively high cost of surfactants, surfactant flooding systems for oil recovery have generally not been economical.

Surfactant flooding to recover oil has been actively investigated due to the relatively poor ability of waterfloods to displace remaining oil from a reservoir's pore structure. Because of the reservoir structure and surface tensions involved, the floodwater may form channels or fingers, bypassing the oil in the formation.

Investigations of ways to increase oil recovery by improving the displacement ability of waterfloods have produced useful surfactants which reduce the interfacial tension between oil and water in the reservoir. With lower interfacial tensions, oil that is trapped in the pore structure can be dispersed into the water as smaller and more easily deformable droplets. Many types of surfactants have been investigated and the choice of which surfactant to employ in a waterflood operation is dependent upon reservoir characteristics as well as the cost and availability of the surfactants.

Lignin is a waste by-product that the pulping industry produces in prodigious amounts. As a result, a large research effort has been undertaken over the last 40 years in attempts to find uses for the large volume of lignin by-product.

Lignin is comprised of polymeric chains having molecular weights over 10,000 with multiple different units. One substantial monomeric unit contained in the lignin polymeric chains is propane phenol.

Numerous oxidation methods of lignin have been tried. The oxidation of lignin by potassium permanganate and sodium periodate is disclosed in Griggs, B. F., "Modification of Kraft Lignins by Sulfomethylation and Oxidative Sulfonation: Structure and Mechanisms", Ph.D. Dissertation, North Carolina State University (1985). The Griggs Dissertation isolated eight specific benzoic acid structures having single or double aromatic rings as oxidation products of lignin. Other potential oxidizing agents have been used to oxidize side chains on benzene. Potassium permanganate is disclosed in Whitmore, F. C. and Woodward, G. E., *Organic Synthesis.* Coll., Vol. I, p. 159 (1944). Chromic acid in aqueous solution is disclosed in Pacaud, R. A. and Allen, C. F. H., *Organic Synthesis, Coll.,* Vol. 2, p. 336 (1943). Chromic acid in acetic acid as an oxidizing agent of side chains has been disclosed in Rieveschl, G., Jr., and Ray, F. E., *Organic Synthesis.* Coll., Vol. 3, p. 420 (1955). Aqueous sodium dichromate is another potential oxidizer of lignin side chains at elevated temperatures. See, Friedman, L. *J. Organic Chemistry,* Vol. 43, p. 80 (1963). Nitric acid has also been employed to oxidize lignins as disclosed in Popa, V. I., *Cellulose Chem. Technology.* Vol. 19, p. 657–661 (1985).

Mild oxidizing agents of lignin such as copper(II) oxide or sulfate, cobalt(II) oxide or sulfate and nitrobenzene are disclosed in Sarkanen, K. V. and Ludwig, C. H., "Oxidation," Chapter 11 of *Lignins -Occurrence, Formation, Structure and Reactions,* John Wiley & Sons, Inc. (1971); and Leopold, B., "Aromatic Keto- and Hydroxy-Polyethers as Lignin Models," *Acta Chemica Scandinavica.* Vol. 4, p. 1523–37 (1950).

Several literature references have discussed a procedure for identifying various structures within lignin polymers. This identification method involves methylating lignin at phenolic groups followed by oxidation with potassium permanganate or potassium permanganate followed by hydrogen peroxide. Please see, Freudenberg, K. and Chen, C. L., *Chem. Ber.,* Vol. 93, p. 2533 (1963); Freudenberg, K., Chen, C. L. and Cardinale, G., *Chem. Ber.,* Vol. 95(11), p. 284 (1962); and Griggs, B. F., Ph.D. Dissertation previously cited.

Procedures on how to make alkyl ethers from lignins may be found in Brauns, F. E., Lewis, H. F. and Brookbank, E. B., "Lignin Ethers and Esters," *Industrial and Engineering Chemistry,* Vol. 37(1) (1945); and Jones, G. M. and Brauns, F. E., "Ethers of Certain Lignin Derivatives," *J. Paper Trade,* Vol. 119(11), p. 108 (1944).

U.S. Pat. Nos. 4,739,041 and 4,790,382 describe a method of producing surfactants from lignin which comprises subjecting lignin to two reactions, alkylation and oxidation. The patent discloses similar results regardless of which reaction occurs first. The lignin surfactants are used in surfactant floods for enhanced oil recovery. However, when preparing surfactant systems with divalent ion brines, these lignin derivatives must be dissolved in fresh water followed by the addition of the other compounds and brine. They will not dissolve in divalent brines alone. They must first be solubilized in fresh water before adding other components. In many cases this is a drawback since fresh water is not readily available in large quantities in the field.

U.S. Pat. Nos. 4,739,040 and 4,787,454 disclose a method of surfactant flooding with lignin surfactants produced by reducing lignin in the presence of a carbon monoxide or hydrogen reducing agent at high temperature and pressure to produce low molecular weight lignin phenols, and subjecting the lignin phenols to one or a combination of several reactions such as alkoxylation, alkylation, sulfonation, sulfation, alkoxysulfation, and sulfomethylation.

Another lignin surfactant variation is disclosed in U.S. Pat. No. 4,781,251 wherein an alkylphenol lignin surfactant is employed in a surfactant flooding system. The alkylphenol lignin surfactant is produced by reacting an alkylphenol having about 6 to about 15 carbon atoms in the alkyl chain with formaldehyde in basic solution at an elevated temperature to form a first reaction product. The first reaction product is then reacted with a kraft lignin at elevated temperature to form an alkylphenol lignin reaction product. Finally, the alkylphenol lignin reaction product is made more water soluble by a reaction selected from the group consisting of sulfonation, sulfation, alkoxysulfonation, alkylsulfation and alkoxylation to produce the alkylphenol lignin surfactant.

SUMMARY OF THE INVENTION

The invention is a method of producing water soluble surfactants from lignin, which comprises alkylating lignin at phenolic oxygen sites with an alkyl chain having about 3 to about 24 carbon atoms, sulfonating the alkylated lignin, and oxidizing the alkylated, sulfonated lignin sufficiently to break the lignin into smaller polymeric and monomeric compounds having water soluble surfactant properties. The invention also includes using these alkylated, sulfonated, oxidized lignin surfactants in surfactant floods for enhanced oil recovery.

DETAILED DESCRIPTION

Because lignin is a high volume waste by-product of the pulping industry, it is a very cheap starting material. The use of these surfactants derived from lignin may reduce surfactant costs for enhanced oil recovery floods by as much as 40% to 60%.

The alkylation, sulfonation and subsequent oxidation of commercially available lignin forms a group of low molecular weight compounds having surfactant properties. Most of these compounds have a cyclic ring structure to which an alkoxy chain and a carboxylic acid group are attached. Some of the compounds may have multiple rings or other substituents. However, the groups of products which result from the alkylation and subsequent oxidation of lignin according to this process are highly efficient surfactants.

The use of the term "lignin surfactant" herein refers to surfactants derived from lignin according to the invention process. A lignin surfactant identified according to "alkylated sulfonated, oxidized lignin" means that alkylation was the first reaction and oxidation was the last reaction." An "alkylated oxidized, sulfonated lignin" was sulfonated after oxidation and is not prepared according to the invention method. There is a difference between these compound mixtures.

The invention lignin surfactants are produced in a three step process. Each step must be performed in order. First, the lignin is alkylated at the phenolic oxygen sites with alkyl chain having about 3 to about 24 carbon atoms, preferably about 6 to about 18 carbon atoms. Second, the alkylated lignin is sulfonated. Third, the alkylated, sulfonated lignin is oxidized sufficiently to break the lignin into smaller polymeric and monomeric compounds having water soluble surfactant properties.

Alkylation as the initial reaction provides some protection for the phenolic oxygen sites and the aromatic ring structure from strong sulfonation and oxidation reactions. For this reason, alkylation as the initial reaction is essential.

The basic monomeric unit of lignin is propane phenol. The compound structures illustrated below indicate the basic structural changes undergone by lignin that is first alkylated, sulfonated and then oxidized according to the present invention to produce small alkylated, sulfonated polymeric units of lignin. Please note that the structure of lignin is complex and variable. These structures represent the changes of a basic unit of lignin.

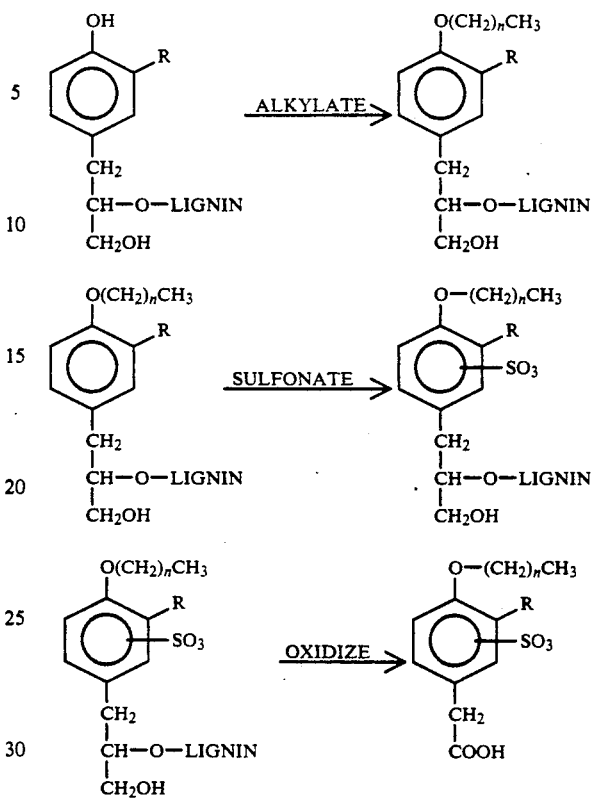

where R=H or OCH$_3$.

The alkylation of lignin is performed at phenolic oxygen sites with an alkyl chain having about 3 to about 24 carbon atoms. Several methods can be employed to alkylate the phenolic oxygen sites. One method that has proven effective is the use of lead acetate (Pb(C$_2$H$_3$O$_2$)$_2$·3H$_2$O). The lead acetate is dissolved in water and then added to a lignin solution. A lignin-lead complex forms as a precipitate which can be reacted at elevated temperature in organic solvent with an alkyl halide to alkylate the lignin at phenolic sites. Although this lead acetate method is effective in alkylating lignin, it has a drawback of producing lead iodide as a by-product, which must be disposed of or regenerated.

A second, and more preferred alkylation method is to react an alkyl halide with the lignin or oxidized lignin at an elevated temperature in the presence of an alcohol. Refluxing an alkyl halide and lignin in a solvent of isopropanol and water for several hours is a more effective way of alkylating lignin than the lead acetate process. Of course, other alkylation methods may be found to be effective in alkylating lignin according to the proposed process.

The different alkylation reactions do not break down or degrade the lignin polymer. It is possible that the alkylation reaction heat may reduce the lignin molecular weight, but not to a substantial degree. The alkylation reaction changes the lignin from a water soluble compound to a water insoluble compound. Sulfonation and later oxidation will change the lignin back to a water soluble compound unless the alkyl chain is exceptionally long or the lignin has more than one aromatic ring.

Analytical tests of alkylated lignins indicate the alkylation occurs at phenolic oxygen sites. Because of the type of reaction performed on the lignin, alkylation will not take place on the carbons of the ring structure. This has been confirmed by Carbon-13 NMR as well as weak acid titration data which indicates that phenolic levels are substantially reduced from the phenolic levels of the starting lignin material.

The second reaction step is sulfonation. There are several methods well-known in the art for sulfonating hydrocarbons. They include sulfuric acid, sulfuric acid with oleum ($SO_3$), sulfur trioxide, and sulfur trioxide/dioxane complex. For the concentrated sulfuric acid sulfonation, the extra sulfonate groups may already be in the sulfuric acid or the sulfonate gas may be bubbled through the sulfuric acid which also contains the compound to be sulfonated.

Previous tests have indicated that $SO_3$ stoichiometry is important. An excess of $SO_3$ may over-sulfonate the alkylated lignin and give an eventual product with higher interfacial tension values.

The oxidizing agent and oxidation conditions must be strong enough to break the alkylated, sulfonated lignin into smaller polymeric and monomeric units and degrade most alkyl chains attached to the aromatic rings to carboxylic acid groups. But oxidation will not significantly affect alkoxy chains at the phenolic sites. Care must be taken to ensure the oxidation reaction is not strong enough to attack the aromatic rings. Since stronger oxidation reactions will increase the product yield, a balance must be struck to ensure product purity.

Not all oxidation agents are suitable for the oxidation of alkylated, sulfonated lignin. Undesirable side reactions such as ring condensation, which would produce relatively high molecular material, must be avoided. The invention process requires an oxidizing agent which breaks the carbon chains between the rings, cleaving the lignin macromolecule into smaller fragments, leaving an aldehyde, ketone or carboxylate group bonded to the aromatic nucleus. Without this step, the solubility of the alkylated, sulfonated lignin is limited.

The stronger oxidation agents for the invention process are potassium permanganate, nitric acid, and a mixture of sodium periodate, hydrogen peroxide and potassium permanganate. Relatively weaker oxidation agents include copper(II) oxide, copper(II) sulfate, cobalt(II) oxide, cobalt(II) sulfate and nitrobenzene. Other oxidation agents which can be employed in the invention include chromium trioxide and catalytic oxidation with oxygen and metal catalysts, chromic acid in aqueous solution or acetic acid, or aqueous sodium dichromate at elevated temperatures.

Preferred oxidizers are hydrogen peroxide, potassium permanganate, nitric acid and a combination of sodium periodate and potassium permanganate. Potassium permanganate as an oxidizing agent has a disadvantage of forming a $MnO_2$ by-product which is not very useful. The sodium periodate and potassium permanganate mixture forms less by-product than the potassium permanganate alone.

If nitric acid is used to oxidize the alkylated, sulfonated lignin, there is no significant by-product from the reaction. Unused nitric acid can always be reused. Oxidation with nitric acid will also deposit nitro ($NO_2$) groups on the aromatic rings, increasing the percentage yield. Interfacial tension values of alkylated, sulfonated lignins that have been oxidized with nitric acid are low.

The use of chromium trioxide will leave some by-products. Oxygen catalyzed with some metal compound such as $PtO_2$, Al, and Pt-C has the advantage of no significant by-products. It should also be possible for certain enzymes to oxidize alkylated, sulfonated lignin to lower molecular weight materials. Specific enzymes have been found in white rot fungus and horseradish which depolymerize lignin. See Kirk, T. K. and Ming, Tien, Science, Vol. 221, p. 661 (1983) and Klibanov, A. M., Chemtech, Vol. 16, p. 354 (1986).

When lignin is subject to oxidation or alkylation alone, the lignin products do not have good surfactant behavior. Indulin C, a trademarked pine kraft lignin sold by Westvaco Corp., was oxidized during several runs. These oxidized only lignins did not show good surface activity at salinities ranging from 2% to 5% by weight of sodium chloride.

The alkylation of kraft lignin was also found to be insufficient by itself. Indulin C was alkylated with a $C_6$ alkyl chain. The resulting product was insoluble in 0.1 M sodium hydroxide solution.

Although excellent surfactants may be made with alkylated, oxidized lignins or oxidized, alkylated lignins such as disclosed in U.S. Pat. Nos. 4,739,041 and 4,790,382, such surfactants do have drawbacks. First, they are usually oil soluble. Second, as noted in the Background section they must first be mixed in fresh water before being added to divalent ion solutions, which exist in numerous reservoirs.

The order of the reaction steps is also important. As noted in the following examples, lignin surfactants that were oxidized prior to sulfonation were not as effective in surfactant corefloods. Although results with these compounds were admirable, the oxidized and then sulfonated lignin surfactants did not provide as high a recovery efficiency as the lignin surfactant sulfonated prior to oxidation. This is despite the fact that lower interfacial tensions were noted for several of the oxidized and then sulfonated compounds.

Without oxidation, the alkylated, sulfonated lignin products are only partially soluble in deionized water and partially soluble in 4% sodium chloride brine. The high interfacial tensions obtained for these products indicates that they lack utility as water soluble surfactants. The reason for insolubility is probably due to the high molecular weight of the alkylated, sulfonated lignin products.

SURFACTACT FLOODING SYSTEMS

The invention also includes the injection of a surfactant flooding system into a reservoir to recover underground hydrocarbons, where the surfactant flooding system contains lignin surfactants produced by the above described process. Depending upon the surfactant formulation, some of these surfactants may be employed as sole surfactants, cosurfactants, or solubilizers in a surfactant flooding system. They may also be used to substitute for a certain percentage of an existing surfactant in a surfactant flooding system to lower the overall cost of the surfactants employed in the flooding system. Many of the lignin surfactants produced according to the above described process provide extremely low interfacial tensions between oil and water, and form stable surfactant systems with many of the commercially available enhanced oil recovery surfactants now on the market.

It is well-known that conventional surfactant flooding mixtures are usually composed of one or more petroleum, petrochemical or synthetic sulfonates, a solubilizer or cosurfactant, brine and, optionally, a quantity of hydrocarbon. These components are normally combined to make a surfactant system.

The surfactant system is conventionally injected into a reservoir to form a front followed by the injection of additional brine or water which may contain a mobility control agent. The surfactant system is usually injected as a slug having about 10% to 20% of the pore volume of the reservoir with a total surfactant and solubilizer concentration of about 0.1% to about 10% by weight. A typical surfactant system may be:

1 one or more petroleum sulfonates such as
   (a) a water soluble sulfonate having a relatively low equivalent weight, or
   (b) an oil soluble sulfonate having a relatively high equivalent weight, or
   (c) any other commercially available petroleum sulfonates;
2. a solubilizer or cosurfactant;
3. brine; and
4. optionally, a light hydrocarbon.

As mentioned before, surfactant flooding systems can be formulated under some conditions without a solubilizer and with only a sole surfactant. Petrochemical and synthetic sulfonates may be substituted for petroleum sulfonates. The surfactant slug may also contain or be preceded by a sacrificial agent.

The present invention resides in the use of about 0.1% to about 10% concentration by weight of lignin surfactants in any surfactant flooding system to recover underground hydrocarbons, wherein the lignin surfactants are prepared according to the described process. Additional surfactants other than the lignin surfactants may be included in the surfactant flooding systems.

Surfactant systems are generally pushed through the formation towards a production well by the subsequent injection of a drive fluid. The drive fluid is usually water, gas or water viscosified by a polymer. Hydrocarbons and other fluids are then recovered at one or more production wells.

The following examples will further illustrate the present invention which discloses a method for producing surfactants from lignin by alkylation, sulfonation and then oxidation of lignin, and employing such lignin surfactants in surfactant flooding systems. These examples are given by way of illustration and not as limitations on the scope of the invention. Thus, it should be understood that reaction steps and amounts may be varied with a process still remaining within the scope of the invention.

BASIC PROCEDURES

Although this language describes an example with dodecane alkylation, the same basic procedure was followed to alkylate, sulfonate and oxidize lignin for all of the tests. Some times and temperatures may be different.

For alkylation, 50 grams of Indulin C (60-70% active) was dissolved into 450 ml of deionized water and warmed to 50° C. in a water bath. 25 grams of lead acetate ($Pb(C_2H_3O_2)_2 \cdot 3H_2O$) was dissolved into 150 ml of distilled water and then poured slowly into the lignin solution. A precipitate formed which was filtered, washed with deionized water and dried. The yield was 50 grams of Indulin C lignin-lead complex.

35 grams of the Indulin C-lead complex was mixed with 19 grams of iodododecane and 100 cc of dioxane. The mixture was heated in a Parr reactor at 180° C. for 9 hours and then poured onto a bed of Celite to remove the powdery lead iodide. Celite is a trademarked silica sold by Johns Manville. The Celite was washed a few times with dioxane and the combined dioxane solutions were rotary evaporated. Hexane was added which precipitated 16.1 grams of solid alkylated ($C_{12}$) lignin.

For sulfonation, 5 grams of alkylated ($C_{12}$) Indulin C was dissolved in 100 ml of nitrobenzene by heating. The amount of $SO_3$ added was based on the phenolic level of the lignin before alkylation. A ratio of 1:1 $SO_3$:alkylated lignin was used with the $SO_3$ complexed to dioxane in a 1:2 $SO_3$ dioxane ratio.

The system required anhydrous conditions with the $SO_3$ to prevent formation of sulfuric acid. Liquid $SO_3$ was removed from the cylinder and the proper amount taken up with a syringe. This $SO_3$ was added to the dioxane in 20 ml of nitrobenzene.

The liquid $SO_3$/dioxane in nitrobenzene solution was added to the nitrobenzene solution containing the alkylated lignin with cooling. Mixture temperature rose to 30° C. After 4 hours of stirring at room temperature, sodium hydroxide was added along with deionized water, raising the pH to about 8-9. The emulsified solution was added to a separatory funnel and the bottom nitrobenzene layer was removed. The water layer was extracted with ethyl ether to remove any remaining nitrobenzene. All water was removed from the product by rotary evaporation. The solid was dissolved in a mixture of isopropanol and water (1:1) to precipitate inorganic sulfate. This was removed by filtration. The solution was then rotary evaporated to produce a alkylated, sulfonated lignin solid.

For oxidation by hydrogen peroxide or nitric acid, the solid compound is solvated in 1% sodium hydroxide or deionized water. Hydrogen peroxide (30% by weight in water) was usually added in the ratio of 1 ml for each gram of alkylated, sulfonated lignin or 5 ml of hydrogen peroxide for each gram of product. Reaction solutions were allowed to stand overnight. A check for the presence of hydrogen peroxide with starch iodide paper failed to detect hydrogen peroxide in solution. Isopropanol was added and the solution allowed to evaporate.

For oxidation with nitric acid, 1 gram of the alkylated, sulfonated lignin was added to 15 ml of concentrated nitric acid. The solutions were stirred for 3-5 minutes at room temperature, then poured onto a bed of ice. The product was collected and dried.

PROCEDURE FOR MEASURING INTERFACIAL TENSION

Interfacial tension (IFT) values were measured with a spinning-drop tensiometer. The IFT of crude oil against field brine is normally measured in units of tens of dynes/cm. Mixtures or compounds added to brine which reduce the interfacial tension to hundreds of mdynes/cm are interfacially active and may be excellent surfactants for enhanced oil recovery.

To measure IFT values, the products were prepared as 2% by weight solutions in sodium chloride brine, which were made alkaline by sodium hydroxide addition. The IFT values were determined after 1 hour of spinning against a mid-Continent crude oil having a viscosity of about 12 centipoise. IFT values were also determined in brine.

EXAMPLES 1-10

Two agents, hydrogen peroxide and nitric acid, were used to oxidize the alkylated, sulfonated Indulin C lignin. For the hydrogen peroxide treatment the compounds were dissolved in 1% sodium hydroxide deionized water. The compounds were treated with hydrogen peroxide in the ratio of 1 ml of hydrogen peroxide or 5 ml of hydrogen peroxide per gram of alkylated, sulfonated product. All the product solutions were stable in the synthetic Illinois brine of 34,400 ppm TDS with a divalent ion concentration of 555 ppm. Examples 9 and 10 of Table 2 illustrate interfacial tension values for alkylated, sulfonated Indulin C that was oxidized by a nitric acid treatment.

EXAMPLES 14–17

Examples 14–17 of Table 4 show interfacial tension data for surfactant systems prepared with invention lignin surfactants oxidized with hydrogen peroxide. Several ternary surfactant formations were tested that contained the lignin surfactant with TRS-18 and LN-60COS. TRS-18 is a trademarked oil soluble sulfonate surfactant having an equivalent weight of about 510 solid by Witco Chemical Co. for enhanced oil recovery purposes. LN-60COS is a sulfated derivative of an eth-

TABLE 1
INTERFACIAL TENSION MEASUREMENTS FOR ALKYLATED, SULFONATED, OXIDIZED INDULIN C ($H_2O_2$ TREATMENT)

| Examples | Carbons In Alkyl Chain | % Bonded Sulfur[1] To Indulin C | $IFT^2$ (mdynes/cm) 1 ml $H_2O_2$ | $IFT^2$ (mdynes/cm) 5 ml $H_2O_2$ |
|---|---|---|---|---|
| 1 | 6  | 9.2  | 1040 | 1210 |
| 2 | 6  | 8.8  | 738  | 889  |
| 3 | 12 | 1.59 | 1260 | 949  |
| 4 | 12 | 5.7  | 563  | —    |
| 5 | 12 | 5.7  | 825  | —    |
| 6 | 12 | 5.7  | —    | 507  |
| 7 | 16 | 0.53 | 665  | —    |
| 8 | 16 | 0.53 | —    | 715  |

[1]Sulfur bonded as sulfonate.
[2]IFT against 12 cp Mid-continent oil in mdynes/cm, 2–3 wt % active solutions, 4–5% NaCl.

TABLE 2
INTERFACIAL TENSION MEASUREMENTS FOR ALKYLATED, SULFONATED, OXIDIZED INDULIN C ($HNO_3$ TREATMENT)

| Examples | Carbons In Alkyl Chain | % Bonded Sulfur[1] | $IFT^2$ (mdynes/cm) in Aqueous NaCL | $IFT^2$ (mdynes/cm) 34,000 ppm TDS |
|---|---|---|---|---|
| 9  | 16 | 0.53 | 3 wt % IPA 4 wt % NaCL 288 md/cm | — |
| 10 | 6  | 0.57 | 1 wt % NaCl 1760 md/cm | 1780 mdynes/cm |

[1]Sulfur bonded as sulfonate.
[2]2–3 wt % active solns.

EXAMPLES 11–13

The Indulin C lignin was alkylated with a 12 carbon chain followed by oxidation with nitric acid. The compound was then sulfonated. The interfacial tension values are reported in Table 3.

TABLE 3
INTERFACIAL TENSION MEASUREMENTS FOR ALKYLATED, OXIDIZED, SULFONATED INDULIN C

| Examples | Carbons In Alkyl Chain | % Bonded Sulfur | $IFT^2$ (mdynes/cm) in 5% Aqueous NaCL | $IFT^2$ (mdynes/cm) in 34,400 ppm TDS |
|---|---|---|---|---|
| 11 | 12 | 2.3 | 221 | —   |
| 12 | 12 | 2.3 | —   | 788 |
| 13 | 12 | 2.3 | —   | 772 |

[1]Sulfur bonded as sulfonate.
[2]2–3 wt % active solns.

oxylated alcohol having approximately 12 to 14 carbon atoms with an average 6 units of ethylene oxide and an equivalent weight of about 550 prepared by Texaco Chemical Co. The ternary surfactant systems were blended to give a total 3 wt% active surfactant in divalent solution. For Example 14, this was 1.2% TR-18, 1.2% lignin surfactant and 0.6% LN-60COS. No fresh water was used to dissolve the invention lignin surfactants.

Interfacial tension values for the ternary systems were extremely low, with three of the four values below 36 md/cm.

TABLE 4
INTERFACIAL TENSION MEASUREMENTS FOR ALKYLATED, SULFONATED, OXIDIZED ($H_2O_2$) INDULIN C FORMULATIONS - 3 WT % ACTIVE

| Examples | Carbons In Alkyl Chain | $H_2O_2$ amount/ A-S Lignin | Relative Wt. Ratios TRS-18/A-S-O/LN-60COS | Brine (ppm TDS) | IFT (md/cm) |
|---|---|---|---|---|---|
| 14 | 12 | 1 ml/g   | 40/40/20 | 34,400 | 35.7 |
| 15 | 12 | 1 ml/g   | 40/40/20 | 34,400 | 19   |
| 16 | 12 | 1.5 ml/g | 40/40/20 | 34,400 | 141  |
| 17 | 12 | 1.5 ml/g | 40/35/25 | 67,700 | 32.3 |

EXAMPLE 18

Example 18 of Table 5 shows interfacial tension data for a lignin surfactant made in a different order than the invention method. The Example 18 product was alkylated, oxidized and then sulfonated. The use of the same ternary system as Example 14 but with the substitution of the non-invention lignin surfactant yielded an IFT value of 1 md/cm. But it must be remembered that although interfacial tension values indicate flooding potential, they are not determinative of performance. In general, IFTs below 100 md/cm indicate considerable potential. They are called ultra low IFT values.

TABLE 5

INTERFACIAL TENSION MEASUREMENTS FOR ALKYLATED, OXIDIZED (HNO₃) SULFONATED INDULIN C FORMULATIONS - 3 WT % ACTIVE

| Example | Carbons In Alkyl Chain | IFT (md/cm) | TRS-18/A-O-S/LN-60COS | Brine (ppm TDS) | IFT md/cm |
|---|---|---|---|---|---|
| 18 | 12 | 772 | 40/40/20 | 34,400 | 1 |

EXAMPLES 19-20

Corefloods were carried out at 74° F. in epoxy-coated Berea sandstone cores which measured "×2"×12". The dry core was saturated with a 34,400 ppm TDS brine prepared in deionized water. The core was flooded to an irreducible water saturation with a mid-Continent crude oil having a viscosity of about 12 centipiose. The oil saturation was typically 0.65. The core was then waterflooded with the same brine to an irreducible oil saturation averaging about 0.37.

The surfactant floods began with the injection of a 0.25 pore volume slug of 3% by weight active surfactant formulation, followed by a continuous polymer drive. The surfactant formulation consisted of 1.2 wt% lignin surfactant, 1.2% of TRS-18 and 0.6 wt% LN-60COS. The formulation was prepared in the same 34,400 ppm TDS brine.

The polymer drive was 0.15 wt% Nalflo 3857 in a fresh water which contained less than 400 ppm TDS. Nalflo 3857 is a trademarked partially hydrolyzed polyacrylamide with an average molecular weight of 10-15 million sold by Nalco Chemical Co.

The Example 19 coreflood with the invention alkylated, sulfonated, oxidized lignin system of Example 14 achieved an outstanding 82.4% recovery efficiency with a final oil saturation of only 0.067 and a change in oil saturation ($\Delta S_o$) of 0.313.

The Example 20 coreflood with the non-invention alkylated, oxidized, sulfonated lignin system of Example 18 achieved a 68.1% recovery efficiency with a final oil saturation of 0.124 and $\Delta S_o$ of 0.265. Although this is a good result, it is nowhere near the 82.4% recovery efficiency achieved with the Example 19 coreflood containing the alkoxylated, sulfonated, oxidized lignin.

It is possible that fine tuning of the Example 20 ternary system could achieve a higher recovery. Such a recovery is evidence that this lignin surfactant provides excellent recovery. A comparison of these examples indicates that there is a definite structural difference between the two lignin surfactants of Examples 19 and 20.

Other variations and modifications may be made in the concepts described above by those skilled in the art without departing from the concepts of the present invention. Accordingly, it should be clearly understood that the concepts disclosed in the description are illustrative only and are not intended as limitations on the scope of the invention.

What is claimed is:

1. A method of recovering hydrocarbons from an underground hydrocarbon formation penetrated by at least one injection well and at least one production well, which comprises:

injecting into the formation through an injection well a surfactant slug comprising about 0.1% to about 10% by weight of an alkylated, sulfonated, oxidized lignin surfactant, said lignin surfactant produced by alkylating lignin at phenolic oxygen sites with an alkyl chain having about 3 to about 24 carbon atoms, sulfonating the alkylated lignin, and oxidizing the alkylated, sulfonated lignin sufficiently to break the lignin into smaller polymeric and monomeric units;

injecting into the formation through the injection well a drive fluid to push the surfactant slug towards a production well; and recovering hydrocarbons at the production well.

2. The method of claim 1, further comprising the use of an oil soluble surfactant in the surfactant slug.

3. The method of claim 1, further comprising the use of a solubilizer in the surfactant slug.

4. The method of claim 1, wherein the drive fluid is an aqueous polymer solution.

5. The method of claim 1, wherein the lignin is alkylated with an alkyl chain having about 6 to about 18 carbon atoms.

6. The method of claim 1, wherein the alkylation is performed with lead acetate to form a lignin-lead complex which is reacted with an alkyl halide.

7. The method of claim 1, wherein the alkylated lignin is sulfonated by reaction with sulfuric acid, sulfuric acid with oleum, sulfur trioxide or sulfur trioxide/dioxane complex.

8. The method of claim 1, wherein the alkylated, sulfonated lignin is oxidized by hydrogen peroxide, potassium permanganate, nitric acid, sodium periodate-potassium permanganate, copper(II) oxide, copper(II) sulfate, cobalt(II) oxide, cobalt(II) sulfate, chromium oxide, oxygen catalyzed by metal catalysts, chromic acid, aqueous sodium dichromate or nitrobenzene.

9. The method of claim 1, wherein the alkylation is performed by reacting the lignin at elevated temperature with an alkyl halide in the presence of alcohol.

10. A method of recovering hydrocarbons from an underground hydrocarbon formation penetrated by at least one injection well and at least one production well, which comprises:

injection into the formation through an injection well a surfactant slug comprising about 0.1% to about 10% by weight of an alkylated, sulfonated, oxidized lignin surfactant, said lignin surfactant produced by alkylating lignin at phenolic oxygen sites with an alkyl halide having about 6 to about 18 carbon atoms in the presence of alcohol at elevated temperature, sulfonating the alkylated lignin, and oxidizing the alkylated, sulfonated lignin with nitric acid or hydrogen peroxide sufficiently to break the lignin into smaller polymeric and monomeric unit shaving water soluble surfactant properties;

injecting into the formation through the injection well a drive fluid to push the surfactant slug towards a production well; and recovering hydrocarbons at the production well.

* * * * *